United States Patent [19]
Alexander

[11] 3,997,313
[45] Dec. 14, 1976

[54] METHOD FOR MAKING OXIDE GLASSES

[75] Inventor: John Henry Alexander, Bishops Stortford, England

[73] Assignee: International Standard Electric Corporation, New York, N.Y.

[22] Filed: July 16, 1975

[21] Appl. No.: 596,548

[30] Foreign Application Priority Data

Aug. 6, 1974 United Kingdom ............ 34548/74

[52] U.S. Cl. ..................................... 65/32; 65/134; 65/DIG. 4; 65/DIG. 7; 75/65 ZM; 106/47 Q; 106/52

[51] Int. Cl.² ........................ C03B 9/30; C03B 5/00

[58] Field of Search ............ 75/60, 30, 65 ZM, 62; 106/51, 47, 52; 423/625; 65/DIG. 7, 32, 30 R, 134, DIG. 4

[56] References Cited

UNITED STATES PATENTS

| 3,047,380 | 7/1962 | Bloem | 75/65 ZM X |
|---|---|---|---|
| 3,162,526 | 12/1964 | Yanik | 75/65 ZM |
| 3,240,560 | 3/1966 | Spear | 423/625 |
| 3,336,159 | 8/1967 | Liebson | 75/65 ZM X |
| 3,469,968 | 9/1969 | Snow | 65/DIG. 4 |
| 3,839,017 | 10/1974 | Schempp | 75/60 X |
| 3,843,229 | 10/1974 | Rosenberger | 65/DIG. 7 |
| 3,884,550 | 5/1975 | Maurer et al. | 65/DIG. 7 |

*Primary Examiner*—Robert L. Lindsay, Jr.
*Attorney, Agent, or Firm*—John T. O'Halloran; Thomas M. Marshall; Richard A. Menelly

[57] ABSTRACT

A method for preparing high purity laser and optical fiber glass by the controlled oxidation of metals initially purified by zone refining processes.

7 Claims, 1 Drawing Figure

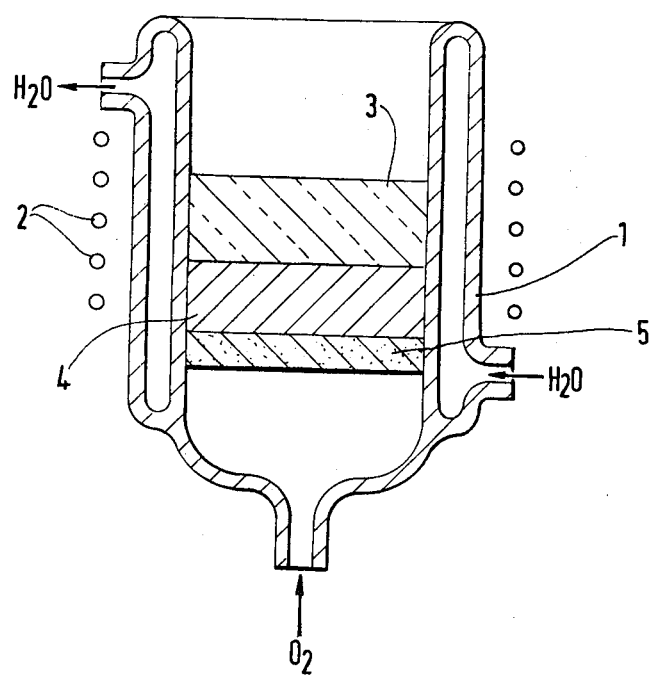

METHOD FOR MAKING OXIDE GLASSES

BACKGROUND OF THE INVENTION

This invention relates to the preparation of glass, and is particularly concerned with the preparation of high purity glasses such as low optical loss glasses required for optical fiber manufacture and those required as host glasses for laser manufacture.

High purity oxide glasses are normally prepared by melting together extremely pure oxides or carbonates of the necessary elements to give the glass. Many of these oxides and carbonates are difficult to prepare with adequate purity by conventional precipitation methods, and as a result are costly. The elements of those of the oxides that are oxides of metallic or semiconductive elements are however relatively easy to purify by zone refining. We disclose that glass of high purity can be made using these zone refined elements as starting materials. The zone refined materials may be oxidized separately but in many instances it is preferable to form a single melt of all the zone refined constituents before oxidation.

SUMMARY OF THE INVENTION

According to the present invention there is provided a method of making an oxide glass wherein those of the constituent oxides that are oxides of metallic or semiconductive elements are prepared by the oxidation of molten quantities of said elements that have been purified by zone refining.

There follows a description of the preparation of a soda lime silicate glass according to the invention.

BRIEF DESCRIPTION OF THE DRAWING

FIG. 1 is a cross-sectional view of the apparatus required for preparing glass according to this invention.

DESCRIPTION OF THE PREFERRED EMBODIMENT

Quantities of sodium, calcium, and silicon are separately zone refined and then placed together in a water cooled silica crucible 1 located inside the work coil 2 of a radio frequency induction heater for radio frequency heating to form a melt 4. Radio frequency heating is chosen because it is less liable to produce contamination of the melt than, for instance, heating in an electric or flame furnace. Similarly a cold crucible is chosen so that contamination of the melt by the crucible shall to minimized.

The crucible contents 4 are heated in an atmosphere or argon containing typically about 1% of dry oxygen. Under these conditions an oxide skin forms on the sodium and the calcium, and subsequently on the surface of the initially molten sodium-calcium mass. This oxide layer cuts down the loss of sodium by vaporization. The loss of sodium is also reduced by maintaining the temperature of the melt for some time at a temperature (say 800° C) just beneath the boiling point of sodium (880° C) in order to allow some of the silicon to go into solution, oxidize, and contribute to the formation of a glassy layer 3 on the surface of the metallic melt 4. Then the temperature of the melt is slowly raised until all the silicon goes into solution. For a typical composition, such as 15% $Na_2O$ 15% CaO 70% $SiO_2$, this should be achieved by the time the melt reaches a temperature of about 1300° C. At this stage oxygen is bubbled through the melt to oxidize it fully while the temperature is further raised to about 1500° C. Conveniently this oxygen is introduced into the melt under pressure through a porous plug 5 in the crucible base.

Further examples of glasses that can be made by this process include those based on the following glass systems, $GeO_2 - SiO_2$, $GeO_2 - SiO_2 - GaO$, $GeO_2 - SiO_2 - Al_2O_3$, $GeO_2 - Al_2O_3 - CaO$. In each of these systems the elemental constituents can all be readily zone refined. To prepare a $GeO_2 - SiO_2$ glass, for example, germanium and silicon are co-melted in their appropriate proportions to form a molten alloy. This melt is then oxidized by bubbling oxygen through it. The initial oxidation can take place with a melt temperature in the region of 1430° C, but this is gradually raised as the proportion of the alloy decreases, until a final temperature in the region of 1800° C is reached when the melt is fully oxidized into a $GeO_2 - SiO_2$ glass. An alternative method of manufacturing this glass is provided by forming a melt of germanium, oxidizing it, adding silicon, and then fully oxidizing the resultant melt.

The majority of the normal constituents of oxide glasses are oxides of metallic or semiconductive elements. Two notable exceptions are the oxides of boron and of phosphorus. The low melting point of phosphorus simplifies the task of zone refining this material, but the high melting point of boron makes it a very difficult material to zone refine. It is believed, however, that for many glass compositions enough zone refined boron can be included in the melt by zone refining a solution of boron in silicon.

Alternately a boron gas or vapor such as boron tribromide can be blown into the melt with the oxygen.

It is to be understood that the foregoing description of specific examples of this invention is made by way of example only and is not to be considered as a limitation on its scope.

What is claimed is:

1. A method for preparing high purity laser and optical fiber glass comprising the steps of:
   separately zone refining a plurality of separate metals to obtain a corresponding plurality of high purity metals;
   heating the high purity metals together in a cooled crucible to obtain a mixture of the high purity metals;
   introducing an atmosphere of argon and oxygen to the surface of the mixture of the high purity metals to form a protective oxide coating on the surface of the metals;
   bubbling oxygen through the mixture of the high purity metals to form a corresponding mixture of high purity metal oxides; and
   heating the mixture of high purity oxides to form the high purity glass.

2. The method of claim 1 wherein the metals are selected from the group consisting of sodium, calcium, silicon, germanium, aluminum and gallium.

3. The method of claim 1 wherein the step of heating the oxides comprises heating the metals to a first temperature to melt the metals and to form a glassy layer on the surface of the melt and heating the melt to a second higher temperature to oxidize the metals.

4. The method of claim 1 wherein the oxygen is introduced through a porous plug in the crucible containing the pure metals.

5. The method of claim 3 wherein the first temperature is between 800° and 880° C.

6. The method of claim 3 wherein the second temperature is between 1300° and 1800° C.

7. The method of claim 1 wherein the oxides comprise 15% $Na_2O$, 15% CaO and 70% $SiO_2$.

* * * * *